United States Patent
Bleckmann et al.

(10) Patent No.: US 6,184,677 B1
(45) Date of Patent: Feb. 6, 2001

(54) MOTION SENSOR HAVING A TIMER AND A SWITCH FOR MEASURING ABSOLUTE FIELD STRENGTH

(75) Inventors: Hans-Wilhelm Bleckmann, Bad Nauheim; Peter Lohberg, Friedrichsdorf; Heinz Loreck, Idstein, all of (DE)

(73) Assignee: ITT Manufacturing Enterprises, Inc., Wilmington, DE (US)

( * ) Notice: Under 35 U.S.C. 154(b), the term of this patent shall be extended for 0 days.

(21) Appl. No.: 08/952,810

(22) PCT Filed: Mar. 27, 1996

(86) PCT No.: PCT/EP96/01338

§ 371 Date: Mar. 9, 1998

§ 102(e) Date: Mar. 9, 1998

(87) PCT Pub. No.: WO96/41133

PCT Pub. Date: Dec. 19, 1996

(30) Foreign Application Priority Data

Jun. 7, 1995 (DE) .............................. 195 20 683

(51) Int. Cl.[7] .............................. G01P 3/44; G01P 3/488; G01D 5/14; G01B 7/30
(52) U.S. Cl. ..................... 324/166; 324/173; 324/207.25
(58) Field of Search ......................... 324/207.11, 207.12, 324/207.18, 207.19, 207.2–207.25, 160, 163, 165, 166, 173, 174

(56) References Cited

U.S. PATENT DOCUMENTS

| | | |
|---|---|---|
| 3,701,941 * | 10/1972 | Bantz et al. ..................... 324/238 |
| 4,468,618 | 8/1984 | Zander . |
| 4,587,485 * | 5/1986 | Papiernik ..................... 324/160 X |
| 4,629,982 | 12/1986 | Kieslich . |
| 4,712,064 * | 12/1987 | Eckardt et al. ................ 324/207.21 |
| 4,783,627 | 11/1988 | Pagel et al. . |
| 4,814,702 * | 3/1989 | Driggers et al. ............ 324/207.24 X |
| 4,952,874 * | 8/1990 | Stadtfeld ..................... 324/207.25 X |
| 5,241,267 * | 8/1993 | Gleixner et al. ................ 324/207.2 |

FOREIGN PATENT DOCUMENTS

U 93 05 385   7/1993 (DE) .

* cited by examiner

*Primary Examiner*—Gerard Strecker
(74) *Attorney, Agent, or Firm*—Rader, Fishman & Grauer PLLC

(57) ABSTRACT

In normal operation, a sensor element emits information only as to whether two or more field-sensitive components are located in peripheral zones of identical or different electromagnetic field strengths of a pulse generator. In order to permit sensor elements of this type determining immediately upon activation of a supply voltage whether an identical electromagnetic field strength on both components corresponds to a zone of low (L) or high (H) field strength, according to the present invention, the sensor element, upon activation of the supply voltage, is initially operated so that the absolute field strength is measured for a given time. If there is a difference circuit between two field-sensitive components (3, 4), the measurement is carried out because one of the components is temporarily switched off, both components are connected in parallel, or both components are connected in series.

5 Claims, 1 Drawing Sheet

MOTION SENSOR HAVING A TIMER AND A SWITCH FOR MEASURING ABSOLUTE FIELD STRENGTH

BACKGROUND OF THE INVENTION

The present invention relates to a motion sensing arrangement, including an active sensor element which cooperates with a pulse generator, wherein the pulse generator by its motion influences an electromagnetic field which is sensed by way of at least two field-sensitive components, the sensor element producing a binary signal which contains data about whether the field-sensitive components sense identical or different field strengths.

Arrangements of this type are generally termed as active motion sensors because the associated sensor elements require a supply voltage of their own. The term 'motion' includes changes of position, displacements, numbers of rotation and motional speeds. Motion sensors are used in the field of mechanical engineering, more particularly in the automotive vehicle industry, and above all in the field of application of controlled brakes, position sensors, angular position sensors, motor-driven adjustment devices or for sensing wheel revolutions.

Motion sensors normally include a pulse generator which is mechanically connected to the part being moved, and a sensor element which scans the pulse generator in a contact-free manner. Such a scanning operation is performed by way of light, high frequency, electric or magnetic fields, in particular by permanent-magnetic fields. All these fields are referred to as electromagnetic fields.

Hole discs, toothed wheels and magnetized structures can be used as pulse generators. A defined air slot is arranged between the pulse generator and the sensor element.

Active motion sensors are operated, for example, by means of the Hall effect or the magnetoresistive effect of thin permalloy layers. The associated sensor elements are provided as chips in silicon or thin film technology. In addition to at least two magnetic-field sensitive components, comprising sensor surface zones, frequently, associated signal amplification electronics, a Schmitt trigger and a protection wiring are mounted on the chip. Embodiments with three-conductor feeds and with two-conductor feeds are known in the art. The present invention can be used for all variations of active sensors. The objective is to improve and extend the possible applications of sensors of this type. In the sensor circuitry, for example, two field-sensitive components are operated in a difference circuit, or four field-sensitive components are operated in a bridge circuit. A binary output signal is generated by an amplifier/trigger circuit in the zone of a nominal air slot irrespective of the size of the air slot. Information about the motion of the pulse generator is obtained from the edge changes of the binary output signal.

The difference circuit or bridge circuit of several field-sensitive components is used, among others, in order to minimize disturbing effects on the output signal which are due to manufacturing tolerances, interference fields and temperature effects. The analysis of a field difference instead of an absolute field strength is common to the difference and bridge circuits. The side effect of the methods is that when a supply voltage is applied, initially, the position of the pulse generator cannot be indicated.

When both field-sensitive components are in the zone of the high field strength, the difference is equal zero exactly as in a position where both field-sensitive components are in a zone of low field strength. Only after one of the sensor components has undergone a change in the field strength (and the other component is still in a zone of the original field strength), is it possible to exactly define an initial position by way of the difference of the field strengths. However, it is desired in many cases of technical applications to be provided with an information about whether the field-sensitive components are in a zone or low or high field strength immediately when the supply voltage is activated.

For example, a binary output signal does not permit an implication of the size of the air slot between the pulse generator and the sensor element. However, when a limiting air slot is exceeded, the output signal is abruptly stopped because it remains under a sensitivity threshold inside the sensor. When an active sensor is inadvertently operated to the limits of its maximum allowed air slot due to inappropriate installation, a sufficient amount of dynamic deformation of the kinematics between the sensor element and the pulse generator will possibly increase the air slot so that the limiting air slot is exceeded and the signal discontinues.

Therefore, an object of the present invention is to provide an arrangement of the above-mentioned type which permits the supply of data about the spacing between the pulse generator and the sensor element instantaneously upon activation of the supply voltage.

SUMMARY OF THE INVENTION

This object is achieved by switch-over of the sensor element to measuring the absolute field strength, which makes it possible to determine the positional relationship between the pulse generator and the sensor element even without motion of the pulse generator.

Switch-over of the sensor element is appropriately performed for limited time intervals. The switch-over action may trigger a time meter, for example. To provide an automatic switch-over action, for example, the trigger may be the activation of the supply voltage necessary for the sensor element. Test runs will thus be started automatically upon each start of operation of the sensor element.

Test runs of this type can be performed in defined time intervals in order to test the proper installation position also during the operation of the sensor element, i.e. when dynamic deformations occur.

Various provisions are possible to achieve an analog signal:

On the one hand, in a difference circuit of the field-sensitive components, only the signal of one single component can be analyzed by suppressing the sensor effect of one of the two components, for example, by short-circuiting this component or by interrupting its signal line to the difference amplifier. On the other hand, it is also possible to operate both components in a series or parallel circuit rather than a difference circuit so that they produce a rectified signal.

Of course, matters can be dealt with similarly in the case of a bridge circuit. Thus, the bridge effect may be eliminated in favor of a circuit combination of all or individual sensor part surfaces, also with additional electronic components, so that a circuit is achieved which permits defining a standard for the absolute field strength.

Where the objective is to use this provision for measuring the absolute field strength to check whether the sensor element is installed in a correct position relative to the pulse generator, the sensor element is appropriately equipped so that it issues a feedback to the electronic control unit when the installation is not correct.

The idea of the present invention will be described in more detail by way of a description of the FIGURE.

DETAILED DESCRIPTION OF THE DRAWING

Figure 1:
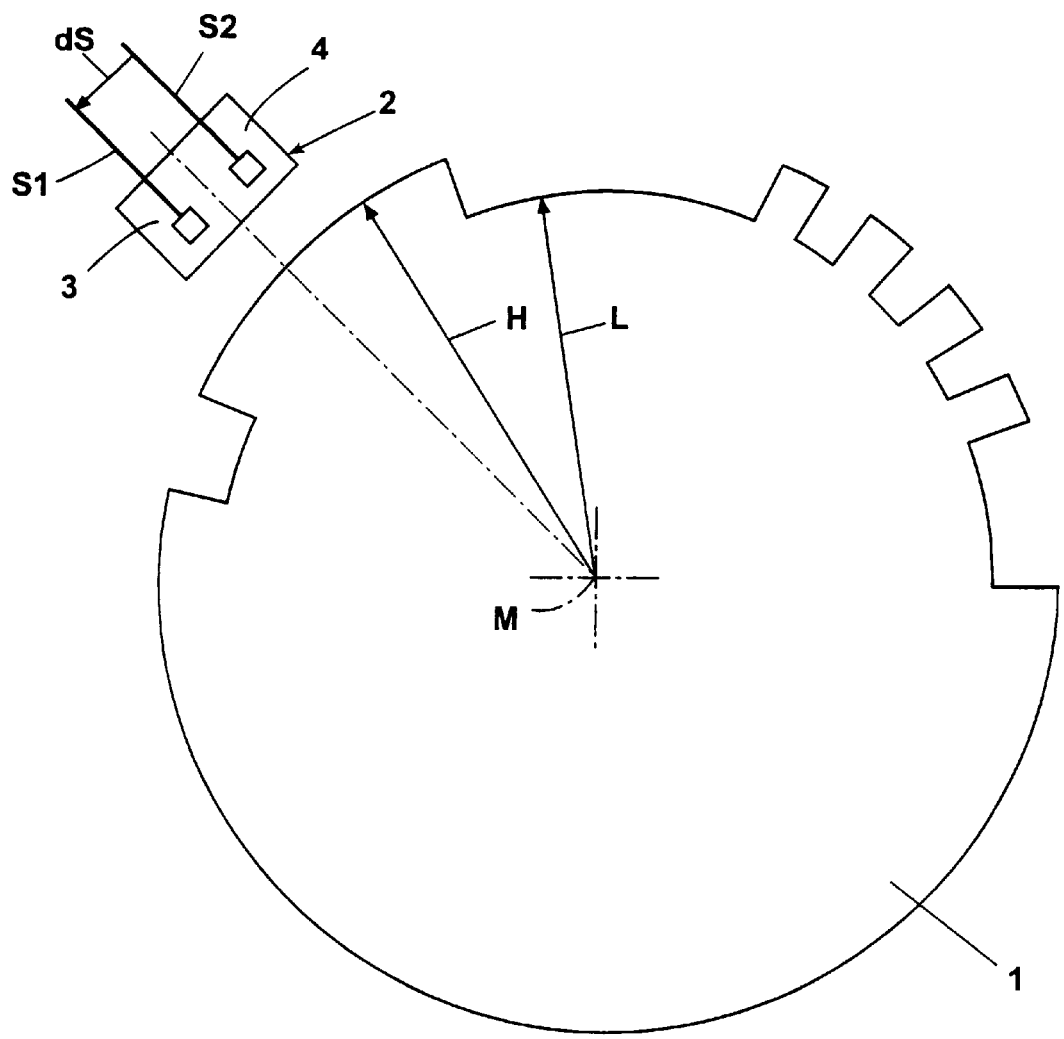
FIG. 1 shows a schematic view of a sensor element in a difference circuit and a pulse generator.

A sensor element 2 having two field-sensitive components 3 and 4 is arranged at a defined distance from the center M of a pulse generator disc 1. The pulse generator disc 1 rotates about the center M. Disc 1 includes an angular information in the form of a binary code by way of two radii H and L (high and low).

The zones of the radii H and L are distributed asymmetrically over the periphery of the pulse generator disc 1 to determine also the direction of rotation of the pulse generator disc. However, this is not important for the present invention.

The field-sensitive components 3 and 4 include sensing surfaces which, in conjunction with the pulse generator disc, each produce an equal signal S1 and S2 when they are both in the zone of the same radius H or L. When one of the field-sensitive components is disposed in a different radius zone than the other one, the signals S1 and S2 are different. The signal difference dS is then analyzed. In a known manner, the sensor element includes a permanent magnet which is not shown for the sake of clarity. Due to the symmetry of the arrangement, dS is equal zero in the peripheral zone with radius H and in the peripheral zone with radius L. Therefore, when the supply voltage is activated, it is unknown whether a signal difference 'dS equals zero' is due to a zone of great or small radius. Defined initial conditions will prevail only when the first edge transition from H to L, or vice-versa, is overridden. However, as described hereinabove, it is desired in many cases of technical application to recognize whether the sensor element is in an H-zone or an L-zone immediately when the operating voltage is activated.

For example, when the signal S2 is suppressed upon activation of the supply voltage, the signal S1 will provide information about the actual spacing from the edge of the pulse generator disc 1. The same applies to the series or parallel circuits where the signal voltages or signal currents are added.

To adjust a time interval for measuring the absolute field strength commencing with the activation of the supply voltage, for example, the course of a counting operation can be used which is initiated with the activation of the supply voltage. This time control and also the alternating linking of the sensor components may be easily integrated additionally in a chip by applying modern microelectronic processes. The switch-over between absolute and differential measurement can be conducted by any known circuit, as represented by block 5 in FIG. 1. The operation and switch-over of block 5 is controlled by a timer, as noted above, which adjusts the length of the limited time interval for measuring the absolute field strength.

The present invention may also be used to check a proper positional relationship between the pulse generator disc 1 and the sensor element 2. The spacing between the sensor element 2 and the pulse generator disc 1 is significant in this respect. To check this air slot, a standard for the absolute field strength in the air slot of the pulse generator disc is produced upon activation of the operating voltage (as described above). The standard is internally classified by an ADC (analog-digital converter) function. Most simply, this can be done by a comparator with an invariable comparison value marking a minimum allowed field strength limit which, in turn, corresponds to a maximum allowed installation air slot. When an inadmissibly large air slot is identified after the activation of the operating voltage, an error feedback is sent to a control unit by way of which the sensor is operated. Different characteristics can be used for the feedback, for example, sending a defined frequency, a defined frequency pattern or a characteristic current level. Checking the air slot can also be repeated during driving of an automotive vehicle.

To identify whether the sensor element is in an H-zone or an L-zone of the pulse generator disc, a standard for the absolute field strength is produced along with the activation of the supply voltage, as has been described hereinabove. Subsequently, the binary signal output level of the sensor is set to H or L corresponding to the present peripheral zone.

What is claimed is:

1. A motion sensing arrangement, comprising:

an active sensor element including at least two-field sensitive components;

a pulse generator that cooperates with the active sensor element, wherein the pulse generator motion influences an electromagnetic field which is sensed by way of the field-sensitive components, and the sensor element produces a binary signal which contains data about whether the field-sensitive components sense identical or different field strengths, wherein the sensor element can be switched over to measuring the absolute field strength; and a timer coupled to the sensor element wherein the switch-over of the sensor element is made for limited time intervals measured by the timer, wherein such a time interval commences at least upon application of a supply voltage to the sensor element.

2. The arrangement as claimed in claim 1, wherein additional time intervals occur in defined time periods.

3. The arrangement as claimed in claim 1, wherein the components used for measuring the absolute field strength are connected in series.

4. The arrangement as claimed in claim 1, wherein the components used for measuring the absolute field strength are connected in parallel.

5. The arrangement as claimed in claim 1, wherein a feedback is sent to a control unit in case the measured absolute field strength indicates an inadmissible deviation in position of the sensor element.

* * * * *

UNITED STATES PATENT AND TRADEMARK OFFICE
CERTIFICATE OF CORRECTION

PATENT NO. : 6,184,677 B1
DATED : February 6, 2001
INVENTOR(S) : Hans-Wilhelm Bleckmann; Peter Lohberg; Heinz Loreck It is certified that error appears in the above-identified patent and that said Letters Patent is hereby corrected as shown below:

Column 4, claim 1,
Line 33, change "the pulse generator motion" to -- the motion pulse generator --.
Line 41, change "element wherein" to -- element, wherein --.

Signed and Sealed this

Twenty-sixth Day of March, 2002

JAMES E. ROGAN
*Director of the United States Patent and Trademark Office*

*Attest:*

*Attesting Officer*